*Robert L. Charlton* INVENTOR.

June 17, 1969 R. L. CHARLTON 3,450,882
LIGHT SENSITIVE CENTER LINE TRACKING SYSTEM
Filed March 17, 1967 Sheet 2 of 2

INVENTOR.

Robert L. Charlton

United States Patent Office 3,450,882
Patented June 17, 1969

3,450,882

LIGHT SENSITIVE CENTER LINE TRACKING SYSTEM

Robert L. Charlton, Earlysville, Va., assignor to Teledyne, Inc., Hawthorne, Calif.

Filed Mar. 17, 1967, Ser. No. 623,989
Int. Cl. G05b *1/00;* G01n *21/30*
U.S. Cl. 250—202 1 Claim

ABSTRACT OF THE DISCLOSURE

A very important feature of my invention is that a photocell or other sensing unit is caused by servo-means to follow the center of a line rather than to follow an edge or boundary of a line as in prior devices. The light means is placed beneath the page or other medium carrying the line. This light means may be stationary or movable with the photocell. Additional features are that the single photocell senses the umbra shadow of the line and the light guide has a diameter substantially equal to the width of the line.

This invention relates to line follower devices and systems.

It is known that various line follower systems have been developed. However, these systems have had shortcomings which have limited their usefulness. Such deficiencies include undesirable features as hunting, instability, lack of accuracy, unreliability and other limitations.

In contrast to conventional systems that use a differential muliple photocell arrangement, my system achieves high performance with only a single photocell that eliminates the dissymmetry error introduced by the differential implementation. I use also a single fiber optic light guide which may include a plurality of fibers. This light guide is mechanically coupled to the output shaft of the positional servo and acts as the signal sensor by transmitting relative position information to the curve follower electronics circuits.

It is, therefore, an object of the present invention to provide a tracing or line follower system which will automatically follow a line or template with a minimum of hunting.

Another object is to provide a line follower which will be sensitive and accurate.

A further object is to provide a light controlled tracing system which is illuminated from beneath a template or drawing.

An additional object is to provide a light controlled tracing system which is highly accurate, but which employs photosensitive units of moderate sensitivity.

Another object is to provide a light controlled tracing system in which the light receiving member is out of contact with the drawing or template.

An addition, and important object, is to provide a line follower system employing only one light sensitive unit instead of two or more as in prior circuits; and thus to eliminate the differential unbalance inherent in a plural photocell system.

Other objects will be evident in the following specification.

Figure 1:
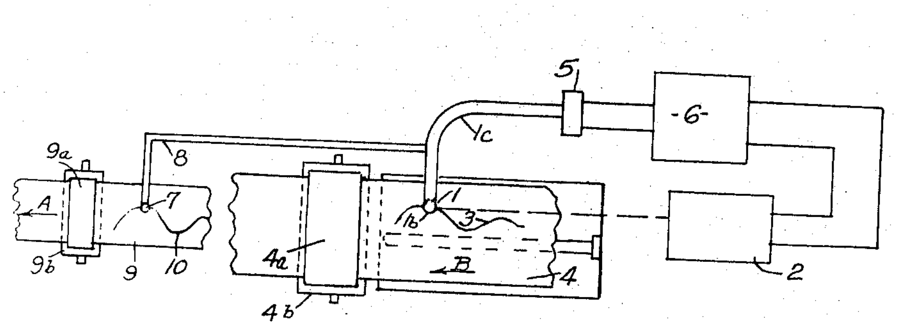
FIGURE 1 is a top plan diagrammatic illustration of my tracer system, including a fiber optic light-receiving member.

In FIGURE 1, fiber optic light guide 1 is mechanically connected to the output shaft of positional servo 2 so that guide 1 may be shifted in forward and reverse direction in one plane which intersects line 3 which is placed on sheet or template 4 the plane of which is preferably perpendicular to the axis of element 1. The light guide does not come into contact with the adjacent sheet 4, but is slighly displaced from it. The light guide preferably comprises a plurality of fibers of menthyl methacrylate or similar light-conducting material and the fibers between the location 1*a* and the end 1*b* (FIG. 2) may be bound together in rigid form or may be encased in a tube. The remainder of the guide 1*c* may be flexible and contains the extended fibers parts of which are in composite member 1. Guide 1*c* leads to photocell or other light-sensitive device 5 which is electrically connected with electronic unit 6 controlling servo unit 2 which moves element 1 in a direction dependent upon the degree of illumination picked up by the light guide and transmitted through cable 1*c* to light-sensitive element 5.

Pen 7 is rigidly attached to members 1–1*c* by means of rod 8 and is moved in consonance with movements of element 1 and across sheet or tape 9 which is moved in the direction of the arrow A by suitably driven rollers 9*a* and 9*b*. Therefore the line or curve 10 traced by pen 7 will be similar to the path traced by element 1, if the sheet 4 is moved at a relative speed equal to that of pen 7 with respect to movement of sheet 9. Of course the speeds need not be equal if identical curves are not desired.

Figure 2:
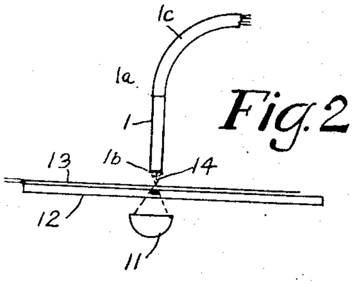
FIGURE 2 is a front edge elevation of a sheet of drawing, a supporting plate, and including a fiber optic light receiving element and illumination means.

As shown in FIGURE 2, electric lamp or source of illumination 11 is placed under glass or other transparent plate 12 on which sheet of drawing 4 with curve 3 (FIG. 1) is placed. The lamp is energized by a suitable source of direct current, to avoid flicker, and the illumination may be directed up against the whole bottom surface of sheet 13 or a small lamp directly beneath light guide 1 may be used. In the latter case the lamp would be mechanically attached to element 1 and will travel with it, suitable brackets being used to prevent the sheet 13 or plate 12 from being struck.

Due to the fact that the device is designed to track the umbra shadow 14, there can be appreciable separation of the light guide from the drawing, without seriously affecting accuracy. This separation prevents the drawing from being scraped and worn by the moving light guide 1.

Figure 3:
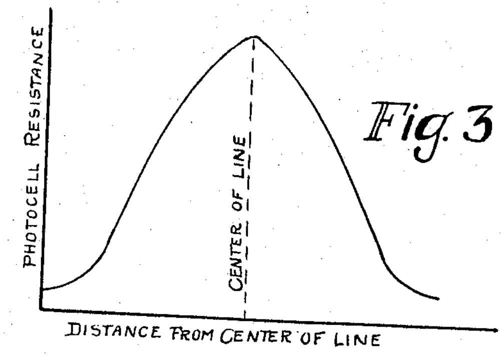
FIGURE 3 is a curve showing photocell resistance versus distance of the fiber optic axis from the center of the line being traced.

The photocell resistance as a function of distance from the center of the line reaches a maximum when the light guide is centered within the umbra shadow produced by illumination beneath the sheet carrying the line or curve as indicated in FIG. 3. This illumination preferably comprises parallel rays although this is not essential. The light guide may be of approximately the same diameter or width as the width of the umbra shadow. These dimensions will provide excellent sensitivity. With proper lighting geometry the axis of the element 1 will lie in a line projected perpendicularly upward from mid-width points of line 3.

An important feature of the controller is that it maximizes the photocell resistance by always causing the pen-moving servo to move in a direction seeking the local maximum automatically through closed loop action. By seeking a local maximum the controller is able to give high performance with a varying line and with varying contrast. This is another desirable feature of my device.

The light guide 1 is mechanically driven at substantially constant velocity by the connected servo 2, except for brief moments during reversals.

Sheet 4 may be moved in the direction of arrow B by means of rollers 4*a* and 4*b* which are rotated at uniform speed by means of a suitable motor or the equivalent, not shown. Rollers 9*a* and 9*b* may be driven similarly. FIGURE 3 shows a curve of photocell resistance vs. distance of the light guide from the center of the line. It will be seen that the resistance is maximum when element 1 is centered on the line, assuming optimum dimensions as previously described.

Referring to the block diagram, FIG. 4, flip flop Q is enabled in the following manner: If the light guide is moving toward a maximum photocell resistance condition as indicated by the sign of the second derivative being positive, i.e. voltage $V_2$ is $+$, the flip flop logic inhibits the input lines of the flip flop so that the direction of movement of the light guide is left unchanged. When, however, the light guide passes over the center of the line the sign of the second derivative changes from $+$ to $(-)$ since the resistance of the photocell is then decreasing due to transmission of more light through guide 1–1*c*. When the sign of the second derivative is $(-)$, flip-flop Q is enabled and it changes state at the arrival of the next clock pulse. This reverses the direction of movement of the light guide which again is moved toward the position of least light transmission or maximum photocell resistance. With suitable choice of clock rate and other parameters, close tracking of curve 3 can be achieved, resulting in stable performance.

Figure 4:
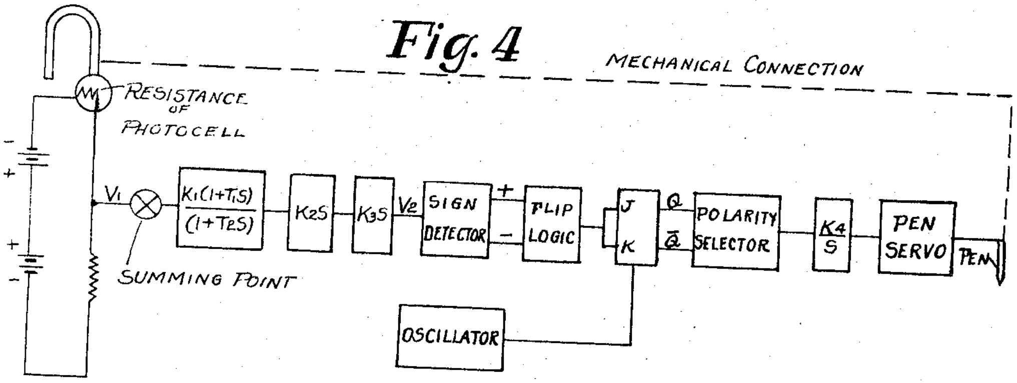
FIGURE 4 is a block circuit diagram illustrating the circuitry for my photosensitive or light controlled tracer system.
Figure 5:
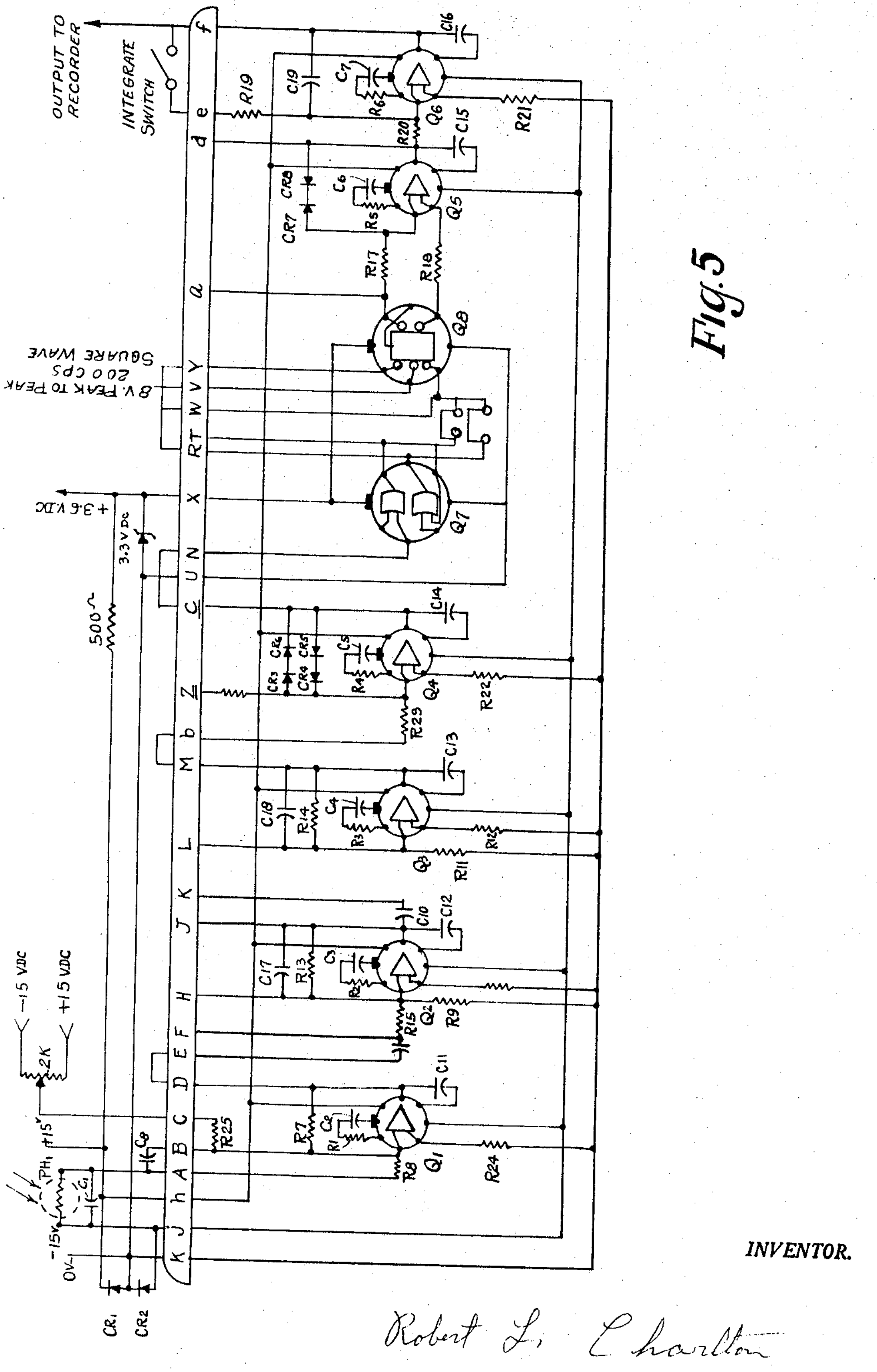
FIGURE 5 shows details of the circuit diagram of FIGURE 4.

As stated before, FIGURE 5 shows details of the block diagram, FIGURE 4. Referring to FIGURE 5, the output of operational amplifier $Q_1$ is represented by the transfer function, using LaPlace transform notation where $s=jw$; the transfer function being $$K_1\left(\frac{1+T_1S}{1+T_2S}\right)$$

where $K_1$ is the steady state gain and time constants $T_1$ and $T_2$ make up a lead-lag network. Numerical values depend upon the dynamics of the pen servo. This portion of the controller receives the photocell input signal, amplifies this signal, and shapes its frequency response. The blocks which indicate differentiation in FIGURE 4, such as $K_2S$, $K_3S$, where $S=d/dt$, are implemented respectively by operational amplifiers $Q_4$ and $Q_5$ in FIGURE 5. The sign of the second derivative is obtained by operational amplifier $Q_4$ and associated circuitry. This portion of the electronics is labeled "Sign Detector" in FIGURE 4.

The flip flop logic $Q_7$ comprises two Nor gates connected in series, giving the necessary power amplification to enable the JK flip flop ($Q_8$ in FIG. 5) to change state if the sign of the second derivative is negative. When the sign of the second derivative is negative the photocell is being moved to the outer edge of the line. By causing the flip flop to change state, the direction of photocell movement is reversed so that travel is then toward the center of the line. To cause the pen servo to reverse direction the polarity selector in FIGURE 4 is activated by the operational amplifier circuit $Q_5$. The output of amplifier $Q_5$ is a constant voltage integrated by operational amplifier $Q_6$ which is shown symbolically as $K_4/S$ in FIGURE 4. The output of amplifier $Q_6$ drives a pen servo, as indicated, which in turn positions the photocell light guide over the center of the line, by means of closed loop control.

The oscillator in FIGURE 4 provides the clock signal to the JK flip flop. Even though the flip flop is enabled by the sign of the second derivative being negative, the flip flop will not change state until a clock pulse arrives from the oscillator. In summary, the operation of the controller is the following: The sign of the second derivative of the input signal is sampled at a frequency of about 200 Hz.; (1) if the sign of the second derivative is negative, the movement of the pen servo is reversed, and (2) if the sign of the second derivative is positive, movement of the pen servo is left unchanged since it is moving toward the center of the line.

I have found that this line follower is quite accurate and provides dependable service in operation.

What I claim is:

1. In a line follower system, means for supporting an element carrying a line, illumination means on one side of said element and producing an umbra shadow of said line on the other side of said element, a single light-sensitive device, light conducting means on said other side of said element and adjacent thereto and having a light-transmitting end surface of substantially the same width as the width of the umbra shadow of said line directed against said end surface, said light-conducting means carrying light to said light-sensitive device when said umbra shadow is not in close register with said light-transmitting end surface, means including servomeans for producing relative movement between said light conducting means and said line-carrying element, and electrical circuitry connecting said light-sensitive device and said servo means to cause said light-transmitting end surface to track said line.

References Cited

UNITED STATES PATENTS

| | | | |
|---|---|---|---|
| 2,838,683 | 6/1958 | Munro | 250—202 X |
| 2,964,240 | 12/1960 | Brinster et al. | 250—219 X |
| 2,989,639 | 6/1961 | Dulebohn et al. | 250—202 |
| 3,155,452 | 11/1964 | Plankeel | 250—202 X |
| 3,335,287 | 8/1967 | Hargens | 250—202 X |

JAMES W. LAWRENCE, *Primary Examiner.*

E. R. LAROCHE, *Assistant Examiner.*

U.S. Cl. XR

250—219